March 2, 1937.  J. M. PESTARINI  2,072,768
ELECTRICAL GENERATOR SUPPLYING TWO LOADS, ONE AT
VARIABLE VOLTAGE AND ANOTHER AT CONSTANT VOLTAGE
Filed Aug. 15, 1934
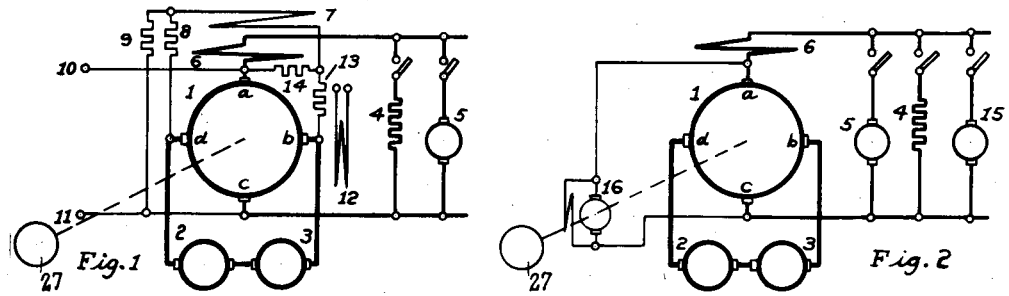
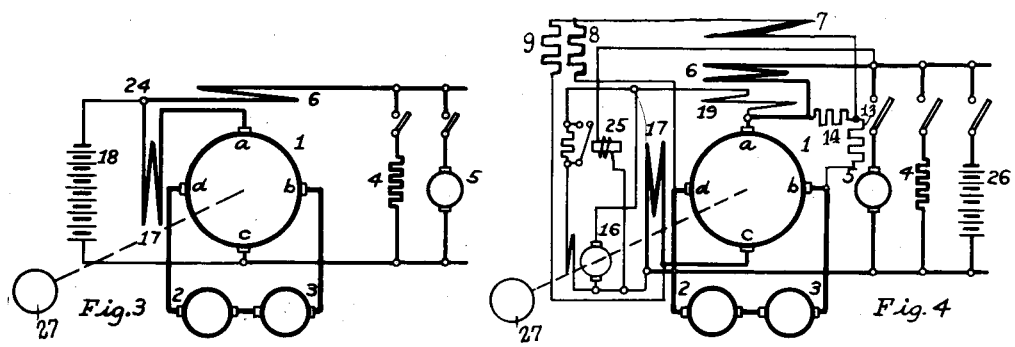
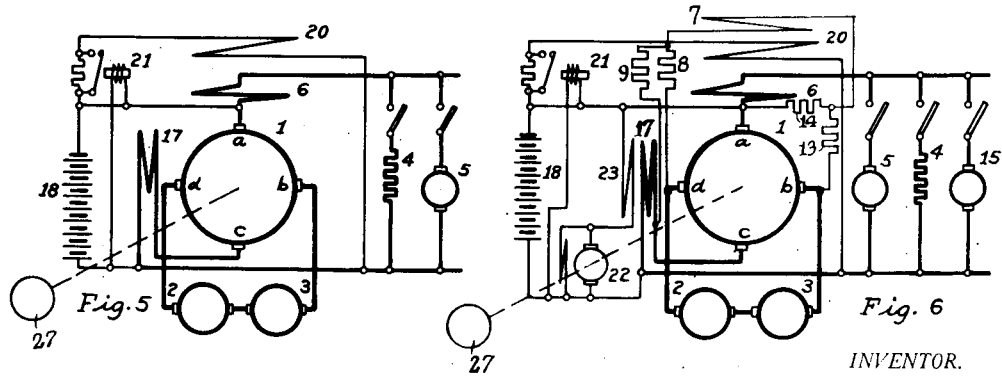
INVENTOR.

Patented Mar. 2, 1937

2,072,768

UNITED STATES PATENT OFFICE 2,072,768

ELECTRICAL GENERATOR SUPPLYING TWO LOADS, ONE AT VARIABLE VOLTAGE AND ANOTHER AT CONSTANT VOLTAGE

Joseph Maximus Pestarini, Grant City, Staten Island, N. Y.

Application August 15, 1934, Serial No. 740,011

29 Claims. (Cl. 172—239)

This invention relates to electrical plants where two loads have to be supplied with direct current, one load, let us call it the main load, requiring a continuously varying voltage, and another load, let us call it supplementary load, requiring a constant voltage.

A Diesel electric locomotive is an important example of such a plant. The traction motors constitute the main load requiring a voltage varying continuously with the speed of the train, and the auxiliary machines, such as the air conditioning machines, the heating resistors, the ventilators, the compressors, the battery, requiring a constant voltage. In the present state of the art two electrical generators are provided; a main generator which with a suitable field adjustment supplies the traction motor load and an auxiliary generator which supplies current at constant voltage to the auxiliary machines.

An object of my invention is to provide an electrical system wherein a metadyne dynamo-electric machine is utilized to provide simultaneously a variable potential source of electrical power and a constant potential source of electrical power.

According to the present invention only a single electrical generator will accomplish both duties in a simple and economical way and with less weight. The single generator is a metadyne provided with special windings, described hereinafter.

A metadyne is an electrical machine described in many previous United States patents, for instance in Patents No. 1,969,699, No. 1,945,447, No. 1,962,030 and essentially consisting of a rotor with winding and commutator like a conventional dynamo and of a stator affording a magnetic circuit of low reluctance to the fluxes created by the rotor ampere turns; two sets of brushes are generally provided, the current traversing one set inducing by its rotor ampere turns an electromotive force between the brushes of the other set, one set, called primary and traversed by a current called primary, has its brushes kept at a constant voltage difference, the other set, called secondary and traversed by a current called secondary, has its brushes connected to the consumers or electrical load supplied with current by the metadyne.

A description in detail of the metadyne principles is given in a paper entitled "Esquisse sur la Metadyne" by J. M. Pestarini, in the "Bulletin Scientifique A. I. M." No. 4, April 1931 of "L'Association des Ingeneurs Electriciens" published by the "Institut electrotechnique Monteflore" Liege, Belgium.

The invention here considered is a special improvement of the metadyne generator object of my U. S. Patent No. 2,038,380 and it will be easier understood if the latter application is borne in mind.

In a metadyne the primary current is automatically so adjusted as to create by its ampere turns combined with the stator ampere turns produced along the primary axis, a flux, called the primary flux, inducing an electromotive force between the secondary brushes and no electromotive force between the primary brushes, of such value as may be required for inducing between the secondary brushes a secondary voltage as required by the main consumers for maintaining a constant secondary current. As explained in the above patents, when the operating conditions vary, the secondary voltage varies and the primary current which produces the secondary voltage inherently adjusts its value correspondingly. If the primary brushes are connected to an auxiliary source, called primary source of the electric power supply, supplying current at a substantially constant voltage, the primary current will traverse this auxiliary source. Let us indicate this current by I'.

If a supplementary load is then connected to the primary brushes of a metadyne constructed as explained above without any auxiliary stator winding, the current, $I_s$, required by the supplementary load, has to be supplied completely by the auxiliary primary source, as the metadyne generator cannot afford to modify its primary current, the primary flux being completely defined by the secondary voltage.

It is desirable that the supplementary current $I_s$ required by the supplementary load be supplied by the metadyne and not by the primary source, that is, that the current supplied by the primary source remain substantially unchanged when a supplementary load is connected to the generator, and this result may be obtained by providing the metadyne with a special stator winding, let us call it S. Such a winding may be constructed and arranged so that when a current flows therethrough it produces a magnetomotive force which substantially compensates for the primary rotor ampere-turns which would be created by the current that traverses this special winding S, if this current traverses the primary rotor winding. This winding S is connected in such a way as to make the current $I_s$ supplied to the supplementary load traverse the special winding S, and the primary auxiliary source is connected so that the current I' is supplied by this auxiliary source of electrical power supply to a point intermediate the connection of the winding S to the primary circuit of the metadyne armature.

The operation will be more clearly understood by a consideration of the currents, voltages, and magnetomotive forces under different operating conditions. If no supplementary load is on the generator, the metadyne rotor primary current equals the current supplied by the primary auxiliary source of electrical power supply and, since in the usual metadyne dynamo-electric machine the voltage induced between the primary brushes $a$ and $c$ is less than the voltage impressed thereon by the primary auxiliary source of electrical power supply, a current $I'$ will flow in a given direction from the auxiliary source of electrical power supply through the primary rotor circuit. At the instant that the supplementary load is connected, a current $I_s$ will be supplied thereto, and this current $I_s$ will flow through the stator winding S. Let us assume that, since the induced voltage between the primary brushes $a$ and $c$ due to the rotor secondary current armature reaction is less than the voltage of the auxiliary source of electrical power supply, this current is supplied from the auxiliary source of electrical power supply, and that the current $I'$ will continue to flow in the same direction in the metadyne armature primary circuit. This current $I^s$ excites the field exciting winding S, and provides primary ampere-turns which are cumulative with respect to the rotor primary ampere-turns and cause a higher voltage to be induced between the secondary brushes, resulting in a higher secondary current flow. This latter current, in turn, induces a higher voltage between the rotor primary brushes $a$ and $c$ opposite to the impressed voltage, and, therefore, decreases the current $I'$ supplied to the metadyne armature primary from the auxiliary source of electrical power supply, and this decrease in the current $I'$ exactly equals the current $I_s$. Thus the current $I'$ flowing through the metadyne armature primary circuit may be reduced to zero or even reversed in direction from the original no supplementary load condition, but the current supplied by the auxiliary source of electrical power supply will remain substantially constant, and the net primary excitation of the metadyne stator and rotor is also maintained substantially constant, irrespective of the supplementary load connected across the metadyne primary circuit. This operation has been explained neglecting the resistance voltage drop, for the compensation of which the primary voltage varies slightly, and which results in a slight corresponding variation in the secondary current, but these slight changes do not affect the inherent regulation of the system as explained above.

For a better understanding of my invention, reference is made to the accompanying drawing wherein the machines are all schematically illustrated and each of the field exciting windings is shown with its axis along the respective axis of the magnetic field which they produced.

The accompanying drawing shows many schemes which illustrates the invention: Fig. 1 shows the general arrangement, the primary source not being indicated for the sake of generality; in Fig. 2 the primary source is a small generator driven by the same shaft as the main metadyne generator; Fig. 3 shows a battery as primary source and gives the scheme of an improved arrangement of the stator windings; Fig. 4 shows some further improvements in the stator windings permitting to reduce the capacity of the primary source; Fig. 5 illustrates a further improvement allowing for a satisfactory means of charging the battery, and Fig. 6 illustrates the application of the present invention in combination with my copending application Serial No. 735,003, filed July 13, 1934, describing an arrangement suitable for Diesel-electric locomotives.

Relating to Fig. 1, the metadyne 1 is driven by a prime mover 27, such as a Diesel engine, and is shown having its primary brushes $a$ and $c$ connected to the terminals 10 and 11 of a primary source of direct current at an essentially constant voltage, and having its secondary brushes $b$ and $d$ supplying with current at variable voltage the main electrical load, such as motors 2 and 3, which constitute the main load. The supplementary load is indicated by a resistor 4 and a motor 5. The current $I_s$ supplied to the auxiliaries constituting a supplementary load traverses the stator winding 6 which substantially compensates for the primary rotor ampere turns created by the supplementary current $I_s$ when this current flows through the primary rotor circuit and has therefore no interference with the ampere turns due to the magnetizing current $I'$, as explained above, drawn from the primary source, the terminals of which, 10 and 11, are shown directly connected to the primary brushes $a$ and $c$. The supplementary load may be switched on or off, it will not affect the resultant ampere-turns in the metadyne and therefore it will not affect the value of the primary and of the secondary voltage. The value of the secondary current is determined by the ampere turns of the "secondary variator winding" 12 having its magnetic axis in the direction of the commutation axis of the secondary brushes $b$ and $d$ and the value of the primary magnetizing current $I'$ is reduced to the desired amount by means of the "primary variator winding" 7, the magnetic axis of which is in the direction of the commutating axis of the primary brushes, $a$ and $c$, and which is connected to the primary and secondary brushes by means of the adjusting resistances 8, 9, 13, 14, according to the invention described in my U. S. Patent No. 2,038,380. The secondary variator winding 12 and the primary variator winding 7 are not indicated in all the further schemes for the sake of simplicity, as not essentially pertaining to the present invention. The field exciting winding 7 and its connections to the primary and secondary brushes through the resistors 8, 9, 13, and 14, however, is shown in Figs. 4 and 6 to more clearly illustrate the excitation systems of the metadyne.

The energy required by the supplementary load being supplied by the main metadyne generator, when the present invention is applied, the primary source may be very small, and in some cases it may be constituted by a small generator driven by the same shaft as the main metadyne generator by a prime mover 27. Fig 2 illustrates this case, the primary source 16 being a small shunt excited dynamo. The supplementary current $I_s$ supplied to the supplementary load 4, 5, and 15, is caused to traverse the primary compensating winding 6.

The operation of a metadyne generator of this type is more stable and smooth when the complete primary current traverses a stator winding constructed and arranged so as to induce between the primary brushes an electromotive force opposing the primary current. This arrangement is shown in Fig. 3, the stator winding in consideration being indicated by 17 traversed by the complete primary current; the primary current I₁ divides into primary magnetizing current I' and supplementary primary current I_s, only at the point 24 located beyond the winding 17. The primary source represented on Fig. 3 is a small battery 18. Thus, if there is any tendency for the machine to "hunt", that is, if, for any reason, the primary rotor current tends to vary in an unstable condition from the desired value, the field exciting winding 17 is constructed and arranged so that any variation from the desired primary rotor current will set up a magnetomotive force along the secondary rotor axis of such magnitude and direction that a voltage will be induced between the primary brushes a and c which will tend to cause a current to flow therebetween of exactly the same magnitude and opposite in direction to the disturbing current variation and thereby damp out the disturbing variation.

Fig. 4 shows a similar arrangement: the primary source 16 is a small auxiliary shunt excited generator driven by the same shaft as the main metadyne generator by a prime mover 27; in order further to reduce the primary magnetizing current, and thus reduce the size of the primary generator 16, a stator winding 19 inducing an electromotive force between the secondary brushes in the same direction as the rotor ampere turns due to the primary magnetizing current, is traversed exclusively by the current supplied from the primary source. The operation of such a winding is clearly explained in my U. S. Patent No. 2,038,380.

On Fig. 4 a vibrating regulator 25 is shown, acting upon the excitation of the primary generator 16 connected directly across the outer primary terminals of the metadyne generator 1 and, therefore, directly responsive to the voltage thereof. The vibrator 25 acts upon the excitation of the small machine 16, by varying the resistance in the field circuits thereof in accordance with the primary metadyne rotor voltage variation and, therefore, maintains substantially constant the primary voltage of the large main metadyne generator which may be important for supplying a supplementary load such as the resistor 4, the motor 5, and the battery 26.

Fig. 5 illustrates an important improvement particularly adapted when the primary source is a battery 18. In order to maintain constant in this case, the primary voltage of the main metadyne generator, independently from the voltage of the battery which varies with the actual state of its charge, a stator winding 20 is provided on the metadyne, inducing by its ampere turns an electromotive force between the secondary brushes, and being traversed by a current adjusted by means of a vibrating regulator 21 sensitive to the primary brush voltage. By the action of the said stator winding the primary voltage is kept constant and the battery is charged until its voltage equals the primary voltage of the metadyne. Thus by a suitable adjustment the main metadyne charges the battery, although the latter acts as primary source of electrical power. As explained above, with respect to the supplementary winding S, it is possible to induce a higher rotor primary voltage than the voltage impressed thereon by providing additional excitation along the primary axis by means of a special stator field exciting winding. The field exciting winding 20 is constructed and arranged so that it will produce the desired magnetomotive force along the metadyne rotor primary axis to maintain a substantially constant voltage across the metadyne rotor primary brushes a and c. If the voltage impressed upon the metadyne primary varies from a predetermined value, the regulator 21 varies the resistance in the circuit of the field exciting winding 20 correspondingly, so that the primary excitation of the metadyne remains substantially constant, irrespective of the charge or voltage of the battery 18, and if the voltage of the battery falls below a predetermined value, the current therethrough will be reversed and be supplied by the metadyne primary circuit, thereby recharging the battery.

Fig. 6 shows the application of the present invention, in combination with the invention described in my copending application Serial No. 735,003, filed July 13, 1934. The latter describes a device involving a regulator machine and a regulator winding upon the metadyne generator and endowing, as a result, the metadyne with an hyperbolic current-voltage characteristic very suitable for Diesel electric locomotives. In Fig. 6 the regulator machine 22 is coupled to the metadyne generator driven by the prime mover 27 and is arranged to energize the regulator winding 23. The main metadyne also is provided with the stator windings 6, 17 and 20 already described, the action of which does not interfere with that of the regulator machine 22 and the regulator winding 23. The current in the winding 20 is adjusted by the vibrating regulator 21 sensitive to the primary voltage. Thus the metadyne generator accomplishes three duties simultaneously: it supplies the main load consisting of two motors 2 and 3 with an hyperbolic current-voltage characteristic, it supplies at constant voltage the supplementary load 4, 5, 15, and finally it charges satisfactorily the battery 18.

Various modifications of the arrangements above described will occur to those skilled in the art. I desire it to be understood, therefore, that my invention is not to be limited to the particular arrangements set forth and I intend in the appended claims to cover all modifications which do not depart from the spirit and scope of my invention.

Having now particularly described and ascertained the nature of my said invention, and in what manner the same is to be performed, I declare that what I claim is:

1. An electrical system including a metadyne dynamo-electric machine having an armature, means including a primary brush set associated with said armature for providing a primary circuit through said armature, a primary load circuit, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, and a second load circuit connected across said secondary brush set.

2. An electrical system including a metadyne generator having an armature, means including a primary brush set associated with said armature for providing a primary circuit through said armature and for producing a primary flux, a primary load circuit, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, and a secondary load circuit connected across said secondary brush set.

3. An electrical system including a metadyne generator having an armature, means including a primary brush set associated with said armature for providing a primary circuit through said armature, a primary load circuit, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a second field exciting winding arranged to produce a component of magnetic flux along the commutating axis of said primary brush set, means dependent upon the electrical potential across said primary brush set and dependent upon the electrical potential across said secondary brush set for energizing said second field exciting winding.

4. An electrical system including a metadyne generator having an armature, means including a primary brush set associated with said armature for providing a primary circuit through said armature, a primary load circuit, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a second field exciting winding arranged to produce a component of magnetic flux along the commutating axis of said primary brush set, means dependent upon the electrical potential across said primary brush set and dependent upon the electrical potential across said secondary brush set for energizing said second field exciting winding, a secondary load circuit connected across said secondary brush set, and means including a third field exciting winding arranged to produce a component of magnetic flux along the commutating axis of said secondary brush set for controlling the current in said secondary circuit.

5. An electrical system including a metadyne generator having an armature, means including a primary brush set associated with said armature for providing a primary circuit through said armature and for producing a primary flux, a primary load circuit, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a second field exciting winding arranged to produce a component of magnetic flux along the commutating axis of said primary brush set, means dependent upon the electrical potential across said primary brush set and dependent upon the electrical potential across said secondary brush set for energizing said second field exciting winding, a secondary load circuit connected across said secondary brush set, and means including a third field exciting winding arranged to produce a component of magnetic flux along the commutating axis of said secondary brush set for controlling the current in said secondary circuit.

6. An electrical system including a metadyne generator having an armature, means including a primary brush set associated with said armature for providing a primary circuit through said armature, a primary load circuit, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, means including a second field exciting winding arranged to produce a component of magnetic flux along the commutating axis of said secondary brush set for controlling the current in said primary circuit, and means for energizing said second field exciting winding in accordance with the current in said primary armature circuit.

7. An electrical system including a metadyne generator having an armature, means including a primary brush set associated with said armature for providing a primary circuit through said armature, a primary load circuit, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a secondary load circuit connected across said secondary brush set, a second field exciting winding arranged to produce a component of magnetic flux along the commutating axis of said primary brush set, and means dependent upon the electrical potential across said primary brush set for energizing said second field exciting winding.

8. An electrical system including a metadyne generator having an armature, means including a primary brush set associated with said armature for providing a primary circuit through said armature and for producing a primary flux, a primary load circuit, means for connecting said primary load circuit across said primary brush set, a source of substantially constant potential electrical power supply, means for connecting said source of supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a second field exciting winding arranged to produce a component of magnetic flux in the same direction as said primary flux, and means for energizing said second field exciting winding in accordance with the current supplied by said source of electrical power supply.

9. An electrical system including a metadyne generator having an armature, means including a primary brush set associated with said armature for providing a primary circuit through said armature and for producing a primary flux, a primary load circuit, means for connecting said primary load circuit across said primary brush set, a field exciting winding arranged to produce a component of magnetic flux along the commutating axis of said primary brush set, means for energizing said field exciting winding in accordance with an electrical characteristic of said primary load circuit, an auxiliary generator, means for driving said auxiliary generator in a predetermined speed relation to the speed of said metadyne generator, a second field exciting winding arranged to produce a component of magnetic flux in the same direction as said primary flux, means for connecting said auxiliary generator and said second field exciting winding in series across said primary brush set, means including a secondary brush set electrically displaced from said primary brush set and associated with said armature for providing a secondary circuit through said armature, means including a third field exciting winding arranged to produce a component of magnetic flux along the commutating axis of said secondary brush set for controlling the current in said primary circuit, and means for energizing said third field exciting winding in accordance with the current in said primary armature circuit.

10. An electrical system including a metadyne generator having an armature, means including a primary brush set associated with said armature for providing a primary circuit through said armature and for producing a primary flux, a primary load circuit, means for connecting said primary load circuit across said primary brush set, a field exciting winding arranged to produce a component of magnetic flux along the commutating axis of said primary brush set, means for energizing said field exciting winding in accordance with an electrical characteristic of said primary load circuit, an auxiliary generator, means for driving said auxiliary generator in a predetermined speed relation to the speed of said metadyne generator, a second field exciting winding arranged to produce a component of magnetic flux along the commutating axis of said primary brush set, means for connecting said auxiliary generator and said second field exciting winding in series across said primary brush set, means including a secondary brush set electrically displaced from said primary brush set and associated with said armature for providing a secondary circuit through said armature, and a secondary load circuit connected across said secondary brush set.

11. An electrical system including a metadyne generator having an armature, means including a primary brush set associated with said armature for providing a primary circuit through said armature and for producing a primary flux, a primary load circuit, means for connecting said primary load circuit across said primary brush set, a field exciting winding arranged to produce a component of magnetic flux along the commutating axis of said primary brush set, means for energizing said field exciting winding in accordance with an electrical characteristic of said primary load circuit, an auxiliary generator, means for driving said auxiliary generator in a predetermined speed relation to the speed of said metadyne generator, means dependent upon the voltage across said primary load circuit for regulating the voltage of said auxiliary generator, a second field exciting winding arranged to produce a component of magnetic flux along the commutating axis of said primary brush set, means for connecting said auxiliary generator and said second field exciting winding in series across said primary brush set, means including a secondary brush set electrically displaced from said primary brush set and associated with said armature for providing a secondary circuit through said armature, and a secondary load circuit connected across said secondary brush set.

12. An electrical system including a metadyne generator having an armature, means including a primary brush set associated with said armature for providing a primary circuit through said armature, a primary load circuit, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a secondary load circuit connected across said secondary brush set, a second field exciting winding arranged to produce a component of magnetic flux along the commutating axis of said secondary brush set, and means for energizing said second field exciting winding in accordance with an electrical characteristic of said primary armature circuit.

13. An electrical system including a metadyne generator having an armature, means including a primary brush set associated with said armature for providing a primary circuit through said armature, a primary load circuit, means for connecting said primary load circuit across said primary brush set, a source of substantially constant potential electrical power supply, means for connecting said primary source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a secondary load circuit connected across said secondary brush set, a second field exciting winding arranged to produce a component of magnetic flux along the commutating axis of said secondary brush set, and means dependent upon the speed of said metadyne generator for energizing said second field exciting winding.

14. An electrical system including a metadyne generator having an armature, means including a primary brush set associated with said armature for providing a primary circuit through said armature, a primary load circuit, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a secondary load circuit connected across said secondary brush set, a second field exciting winding arranged to produce a component of magnetic flux along the commutating axis of said primary brush set, means dependent upon the electrical potential across said primary brush set for energizing said second field exciting winding, a third field exciting winding arranged to produce a component of magnetic flux along the commutating axis of said secondary brush set, and means for energizing said third field exciting winding in accordance with an electrical characteristic of said primary armature circuit.

15. An electrical system including a metadyne generator having an armature, means including a primary brush set associated with said armature for providing a primary circuit through said armature, a primary load circuit, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a second field exciting winding arranged to produce a component of magnetic flux along the commutating axis of said secondary brush set, means for energizing said second field exciting winding in accordance with an electrical characteristic of said primary circuit, a third field exciting winding arranged to produce a component of magnetic flux along the commutating axis of said primary brush set, and means dependent upon the electrical potential across said primary brush set for controlling the energization of said third field exciting winding.

16. An electrical system including a metadyne generator having an armature, means including a primary brush set associated with said armature for providing a primary circuit through said armature, a primary load circuit, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a second field exciting winding arranged to produce a component of magnetic flux along the commutating axis of said secondary brush set, means for energizing said second field exciting winding in accordance with an electrical characteristic of said primary armature circuit, a third field exciting winding arranged to produce a component of magnetic flux along the commutating axis of said primary brush set, means dependent upon the electrical potential across said primary brush set for controlling the energization of said third field exciting winding, a fourth field exciting winding for said metadyne generator arranged to produce a component of flux along the commutating axis of said secondary brush set, and means dependent upon an operating characteristic of said generator and including a dynamo-electric machine for energizing said fourth field exciting winding.

17. An electrical system including a metadyne generator having an armature, means including a primary brush set associated with said armature for providing a primary circuit through said armature, a primary load circuit, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, means including a second field exciting winding arranged to produce a component of magnetic flux along the commutating axis of said secondary brush set, means for energizing said second field exciting winding in accordance with an electrical characteristic of said primary armature circuit, a third field exciting winding arranged to produce a component of magnetic flux along the commutating axis of said primary brush set, means for energizing said third field exciting winding, means dependent upon the electrical potential across said primary brush set for controlling the energization of said third field exciting winding, means including a fourth field exciting wnding arranged to produce a component of flux along the commutating axis of said secondary brush set for regulating the power output of said metadyne generator, and means dependent upon an operating characteristic of said metadyne generator and including an auxiliary generator for energizing said fourth field exciting winding.

18. A power system for locomotives or cars including a prime mover, a metadyne generator having an armature driven by said prime mover, means including a primary brush set associated with said armature for providing a primary circuit through said armature, a primary load circuit for supplying auxiliaries associated with the locomotive or car, means for connecting said primary load circuit across said primary brush set, a source of substantially constant potential electric power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a driving motor, and means for connecting said driving motor across said secondary brush set.

19. A power system for locomotives or cars including a prime mover, a metadyne generator having an armature driven by said prime mover, means including a primary brush set associated with said armature for providing a primary circuit through said armature, a primary load circuit for supplying auxiliaries associated with the locomotive or car, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a second field exciting winding arranged to produce a component of magnetic flux along the commutating axis of said primary brush set, means dependent upon the electrical potential across said primary brush set and dependent upon the electrical potential across said secondary brush set for energizing said second field exciting winding, a driving motor for the locomotive or car, means for connecting said driving motor across said secondary brush set, and means including a third field exciting winding arranged to produce a component of magnetic flux along the commutating axis of said secondary brush set for controlling the current in said secondary circuit.

20. A power system for locomotives or cars including a prime mover, a metadyne generator having an armature driven by said prime mover, means including a primary brush set associated with said armature for providing a primary circuit through said armature, a primary load circuit for supplying auxiliaries associated with the locomotive or car, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a second field exciting winding arranged to produce a component of magnetic flux along the commutating axis of said secondary brush set, means for energizing said second field exciting winding in accordance with the current in said primary armature circuit, a driving motor for the locomotive or car, and means for connecting said driving motor across said secondary brush set.

21. A power system for locomotives or cars including a prime mover, a metadyne generator having an armature driven by said prime mover, means including a primary brush set associated with said armature for providing a primary circuit through said armature, a primary load circuit for supplying auxiliaries associated with the locomotive or car, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a driving motor for the locomotive or car, means for connecting said driving motor across said secondary brush set, a second field exciting winding arranged to produce a component of magnetic flux along the commutating axis of said primary brush set, and means dependent upon the electrical potential across said primary brush set for energizing said second field exciting winding.

22. A power system for locomotives or cars including a prime mover, a metadyne generator having an armature driven by said prime mover, means including a primary brush set associated with said armature for providing a primary circuit through said armature, a primary load circuit for supplying auxiliaries associated with the locomotive or car, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a driving motor for the locomotive or car, means for connecting said driving motor across said secondary brush set, a second field exciting winding arranged to produce a component of magnetic flux along the commutating axis of said secondary brush set, and means dependent upon the speed of said metadyne generator for energizing said second field exciting winding.

23. A power system for locomotives or cars including a prime mover, a metadyne generator having an armature driven by said prime mover, means including a primary brush set associated with said armature for providing a primary circuit through said armature, a primary load circuit for supplying auxiliaries associated with the locomotive or car, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a driving motor for the locomotive or car, means for connecting said driving motor across said secondary brush set, a second field exciting winding arranged to produce a component of magnetic flux along the commutating axis of said primary brush set, means dependent upon the electrical potential across said primary brush set for energizing said second field exciting winding, a third field exciting winding arranged to produce a component of magnetic flux along the commutating axis of said secondary brush set, and means for energizing said third field exciting winding in accordance with an electrical characteristic of said primary armature circuit.

24. A power system for locomotives or cars including a prime mover, a metadyne generator having an armature driven by said prime mover, means including a primary brush set associated with said armature for providing a primary circuit through said armature, a primary load circuit for supplying auxiliaries associated with the locomotive or car, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a driving motor for the locomotive or car, means for connecting said driving motor across said secondary brush set, a second field exciting winding arranged to produce a component of magnetic flux along the commutating axis of said secondary brush set, means for energizing said second field exciting winding in accordance with an electrical characteristic of said primary circuit, a third field exciting winding arranged to produce a component of magnetic flux along the commutating axis of said primary brush set, and means dependent upon the electrical potential across said primary brush set for controlling the energization of said third field exciting winding.

25. A power system for locomotives or cars including a prime mover, a metadyne generator having an armature driven by said prime mover, means including a primary brush set associated with said armature for providing a primary circuit through said armature, a primary load circuit for supplying auxiliaries associated with the locomotive or car, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a driving motor for the locomotive or car, means for connecting said driving motor across said secondary brushes, a second field exciting winding arranged to produce a component of magnetic flux along the commutating axis of said secondary brush set, means for energizing said second field exciting winding in accordance with an electrical characteristic of said primary armature circuit, a third field exciting winding arranged to produce a component of magnetic flux along the commutating axis of said primary brush set, means dependent upon the electrical potential across said primary brush set for controlling the energization of said third field exciting winding, a fourth field exciting winding for said metadyne generator arranged to produce a component of flux along the commutating axis of said secondary brush set, and means dependent upon an operating characteristic of said generator and including a dynamo-electric machine for energizing said fourth field exciting winding.

26. A power system for locomotives or cars including a prime mover, a metadyne generator having an armature driven by said prime mover, means including a primary brush set associated with said armature for providing a primary circuit through said armature, a primary load circuit for supplying auxiliaries associated with the locomotive or car, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a driving motor for said locomotive or car, means for connecting said driving motor across said secondary brush set, and means dependent upon the voltage across said primary brush set for maintaining the voltage thereacross substantially constant.

27. A power system for locomotives or cars including a prime mover, a metadyne generator having an armature driven by said prime mover, means including a primary brush set associated with said armature for providing a primary circuit through said armature, a primary load circuit for supplying auxiliaries associated with the locomotive or car, means for connecting said primary load circuit across said primary brush set, an electric battery, means for connecting said electric battery across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing the secondary circuit through said armature, a driving motor for the locomotive or car, means for connecting said driving motor across said secondary brush set, and means dependent upon the voltage across said primary brush set for maintaining the voltage thereacross and the voltage of said battery substantially constant.

28. A power system for locomotives or cars including a prime mover, a metadyne generator having an armature driven by said prime mover, means including a primary brush set associated with said armature for providing a primary circuit through said armature, a primary load circuit for supplying auxiliaries associated with the locomotive or car, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting windings in accordance with an electrical characteristic of said primary load circuit, means including a secondary brush set electrically displaced from said primary brush set and associated with said armature for providing a secondary circuit through said armature, a driving motor for the locomotive or car, means for connecting said driving motor across said secondary brush set, means dependent upon the voltage across said primary brush set for maintaining the voltage thereacross substantially constant, a second field exciting winding arranged to produce a component of magnetic flux along the commutating axis of said secondary brush set, and means for energizing said second field exciting winding in accordance with an electrical characteristic of said primary armature circuit.

29. A power system for locomotives or cars including a prime mover, a metadyne generator having an armature driven by said prime mover, means including a primary brush set associated with said armature for providing a primary circuit through said armature, a primary load circuit for supplying auxiliaries associated with the locomotive or car, means for connecting said primary load circuit across said primary brush set, a source of substantially constant potential electrical power supply, means for connecting said source of electrical power supply across said primary brush set, a field exciting winding arranged to produce a component of magnetic flux along the commutating axis of said primary brush set, means for energizing said field exciting winding in accordance with an electrical characteristic of said primary load circuit, means including a secondary brush set electrically displaced from said primary brush set and associated with said armature for providing a secondary circuit through said armature, a driving motor for the locomotive or car, means for connecting said driving motor across said secondary brush set, a second field exciting winding arranged to produce a component of magnetic flux along the commutating axis of said secondary brush set, means for energizing said second field exciting winding in accordance with an electrical characteristic of said primary armature circuit, means dependent upon the voltage across said primary brush set for maintaining the voltage thereacross substantially constant, a third field exciting winding for said metadyne generator arranged to produce a component of flux along the commutating axis of said secondary brush set, and means dependent upon the speed of said generator and including a dynamo-electric machine for energizing said third field exciting winding.

JOSEPH MAXIMUS PESTARINI.